United States Patent
Ristoski et al.

(10) Patent No.: US 7,360,552 B2
(45) Date of Patent: Apr. 22, 2008

(54) INJECTABLE STRUCTURAL ADHESIVE

(75) Inventors: Tony Ristoski, Rochester Hills, MI (US); Marc A. McMaken, Richmond, MI (US); Christopher A. Brewster, Sterling Heights, MI (US); Gregory J. Korchnak, Howell, MI (US)

(73) Assignee: Dow Global Technologies Inc., Midland, MI (US)

( * ) Notice: Subject to any disclaimer, the term of this patent is extended or adjusted under 35 U.S.C. 154(b) by 297 days.

(21) Appl. No.: 10/831,779

(22) Filed: Apr. 23, 2004

(65) Prior Publication Data
US 2005/0236039 A1  Oct. 27, 2005

(51) Int. Cl.
*F16K 24/04* (2006.01)

(52) U.S. Cl. .................. 137/15.09; 137/43; 285/295.3; 285/296.1

(58) Field of Classification Search ......... 285/295.3 X, 285/296.1 X; 137/39, 43 I, 15.01, 15.09
See application file for complete search history.

(56) References Cited

U.S. PATENT DOCUMENTS

| | | | |
|---|---|---|---|
| 1,463,692 A * | 7/1923 | Hail | 285/296.1 |
| 2,993,876 A | 7/1961 | McGlamery | |
| 3,250,825 A | 5/1966 | Martinovich | |
| 3,920,268 A * | 11/1975 | Stewing | 285/21.1 |
| 4,058,234 A | 11/1977 | Vrolyk et al. | |
| 4,131,980 A | 1/1979 | Zinnbauer | |
| 4,160,465 A | 7/1979 | Hsu | |
| 4,174,245 A | 11/1979 | Martineau | |
| 4,204,050 A | 5/1980 | Bressler et al. | |
| 4,345,698 A | 8/1982 | Villemain | |
| 5,106,928 A | 4/1992 | Skoultchi et al. | |
| 5,143,884 A | 9/1992 | Skoultchi et al. | |
| 5,166,007 A | 11/1992 | Smith et al. | |
| 5,272,236 A | 12/1993 | Lai et al. | |
| 5,278,272 A | 1/1994 | Lai et al. | |
| 5,286,821 A | 2/1994 | Skoultchi | |
| 5,310,835 A | 5/1994 | Skoultchi et al. | |
| 5,376,746 A | 12/1994 | Skoultchi | |
| 5,404,907 A * | 4/1995 | Benjey et al. | 137/587 |
| 5,449,207 A * | 9/1995 | Hockett | 156/305 |
| 5,458,258 A | 10/1995 | White et al. | |

(Continued)

FOREIGN PATENT DOCUMENTS

DE          2361215          6/1975

(Continued)

OTHER PUBLICATIONS

Dow Chemical Company; "Body Engineered Systems;" www.dow.com; 1995-2004.

(Continued)

*Primary Examiner*—Stephen M. Hepperle
(74) *Attorney, Agent, or Firm*—Richard W. Hoffmann; Reising Ethington Barnes Kisselle PC

(57) ABSTRACT

Injectable structural adhesives, methods of using the same, and products formed therewith, are described. The adhesive is introduced through a first opening into an internal cavity formed between two or more components. The adhesive is then permitted or forced to flow through the internal cavity, substantially filling the cavity, until it reaches a second spaced opening. Any air contained within the internal cavity is removed by the flow of the adhesive.

41 Claims, 4 Drawing Sheets

U.S. PATENT DOCUMENTS

| | | | |
|---|---|---|---|
| 5,520,422 A * | 5/1996 | Friedrich et al. | 285/318 |
| 5,539,070 A | 7/1996 | Zharov et al. | |
| 5,565,248 A | 10/1996 | Plester et al. | |
| 5,616,796 A | 4/1997 | Pocius et al. | |
| 5,621,143 A | 4/1997 | Pocius | |
| 5,681,910 A | 10/1997 | Pocius | |
| 5,686,544 A | 11/1997 | Pocius | |
| 5,690,780 A | 11/1997 | Zharov et al. | |
| 5,691,065 A | 11/1997 | Zharov et al. | |
| 5,702,770 A | 12/1997 | Martin | |
| 5,718,967 A | 2/1998 | Hu et al. | |
| 5,718,977 A | 2/1998 | Pocius | |
| 5,795,657 A | 8/1998 | Pocius et al. | |
| 5,900,284 A | 5/1999 | Hu | |
| 5,950,659 A * | 9/1999 | Szlaga et al. | 137/202 |
| 6,110,544 A | 8/2000 | Yang et al. | |
| 6,706,831 B2 | 3/2004 | Sonnenschein et al. | |
| 6,710,145 B2 | 3/2004 | Sonnenschein et al. | |
| 2002/0195453 A1 | 12/2002 | McLeod | |
| 2003/0044553 A1 | 3/2003 | Ramanathan et al. | |
| 2003/0047268 A1 | 3/2003 | Korchnak et al. | |

FOREIGN PATENT DOCUMENTS

| | | |
|---|---|---|
| DE | 3210332 | 9/1983 |
| DE | 3422973 | 2/1985 |
| DE | 3908418 | 9/1990 |
| DE | 19534324 | 3/1997 |
| DE | 19946290 | 4/2001 |
| DE | 10103149 | 8/2002 |
| DE | 10112133 | 9/2002 |
| EP | 1108586 | 6/2001 |
| FR | 2 745 735 | 9/1997 |
| JP | 11105557 | 4/1999 |
| WO | WO95/05940 | 3/1995 |
| WO | WO97/17383 | 5/1997 |
| WO | WO 00/48859 | 8/2000 |
| WO | WO 03/018699 | 3/2003 |
| WO | WO 03/018705 | 3/2003 |
| WO | WO2004/060984 A | 7/2004 |

OTHER PUBLICATIONS

Dow Chemical Company; "Adhesives;" www.dow.com; 1995-2004.

Gareth McGrath; "Adhesives—Modern Types of Adhesives;" "Materials Information Service;" 2004.

Dow Chemical Company; "Dow Polyurethane Systems Products—Voramer;" www.dow.com; 1995-2004.

Dow Chemical Company; "Dow Polyurethane Systems Products—Vorastar;" www.dow.com; 1995-2004.

Dow Chemical Company; "Dow Polyurethane Systems Products—Enerbond Products;" www.dow.com; 1995-2004.

Dow Chemical Company; "Dow Polyurethane Systems Products—Voratron;" www.dow.com; 1995-2004.

Dow Chemical Company; "Dow Polyurethane Systems Products—Specfil;" www.dow.com; 1995-2004.

GLOBALSPEC; "Acrylic Adhesives and Acrylate Adhesives;" Feb. 11, 2004.

Society of Adhesion And Adhesives, "Sae VI Extended Abstracts"; Ewen JC Kellar, "Innovation Combined With Injection—Applications In Adhesives Bonding".

* cited by examiner

INJECTABLE STRUCTURAL ADHESIVE

FIELD OF THE INVENTION

The present invention relates generally to injectable structural adhesives, and more particularly to injectable structural adhesives for joining components together that have an internal cavity formed therebetween, wherein the adhesive is injected into a first opening, the adhesive at least substantially filling the cavity, with any air in the cavity escaping through a spaced second opening.

BACKGROUND OF THE INVENTION

Automobile fuel tanks are typically comprised of various plastic materials, such as high-density polyethylene materials. Recently, the use of rollover valves, in conjunction with fuel tanks, has increased in order to prevent fuel from escaping the fuel tank, e.g., when a rollover accident has occurred. The rollover valve assembly typically includes a plastic surface or structure that is intended to mate (e.g., concentrically through a snap-fit configuration) with and be bonded to a corresponding structure or surface formed on, or near the exterior surface of the fuel tank.

Generally, it has been customary to bond the rollover valve assembly to the fuel tank by a process generally referred to as hot plate welding. Hot plate welding is generally unsuitable for welding large and irregularly shaped parts with difficult contours and joint lines. Hot plate welding uses a heated platen to radiate heat through close proximity and melt the joining surfaces. After the part interfaces have been melted, the parts are brought together to form a seal therebetween. Thus, in this particular application, only the peripheral surfaces of the rollover valve assembly and the fuel tank are typically bonded together.

This method suffers from several disadvantages in that the peripheral bond may be susceptible to breaches or failures, e.g., due to either improper welding techniques and/or the corrosive characteristics of the various fuels contained within the fuel tank. Additionally, this method does not provide enhanced structural support to the bonded rollover valve/fuel tank assembly.

Therefore, there exists a need for components formed with injectable structural adhesives and methods for accomplishing the same, including those suitable for bonding rollover valve assemblies to fuel tanks.

SUMMARY OF THE INVENTION

In accordance with the general teachings of the present invention, two or more components are preferably bonded together with an adhesive. The respective components are preferably brought into contact with one another such that an internal cavity is formed therebetween. On an external surface of one of the components, at least two apertures are preferably formed therein, wherein the apertures are preferably spaced and still more preferably opposed from each other. The adhesive is then preferably introduced through one of the apertures into the cavity. As more adhesive is introduced, the adhesive is preferably allowed or caused to flow through the cavity towards the location of the other aperture or apertures. Once the adhesive reaches the other aperture or apertures, the introduction of any additional adhesive is preferably ceased. The adhesive preferably substantially fills the entire volume of the cavity. Any air that was initially contained within the cavity is preferably removed by the flow of the adhesive. The adhesive is then preferably allowed to cure or harden, thus providing enhanced structural support to the bonded components in addition to providing a bonding function between the components.

In accordance with a first embodiment of the present invention, a bonded component system is provided, comprising: (1) a first component; (2) a second component adjacent to the first component, the second component having at least two spaced apertures formed on an external surface thereof, wherein an area defining an internal cavity is formed between the first component and the second component; and (3) an adhesive material disposed within the cavity sufficient to bond the first component to the second component, wherein the adhesive material is introduced into the cavity through either of the apertures.

In accordance with a second embodiment of the present invention, a bonded component system is provided, comprising: (1) a first component; (2) a second component adjacent to the first component, the second component having at least two substantially spaced and opposed apertures formed on an external surface thereof, wherein an area defining an internal cavity is formed between the first component and the second component; and (3) an adhesive material disposed within the cavity sufficient to bond the first component to the second component, wherein the adhesive material is introduced into the cavity through either of the apertures, wherein the adhesive material substantially completely fills the cavity.

In accordance with a third embodiment of the present invention, a gas tank system is provided, comprising: (1) a gas tank; (2) a rollover valve assembly adjacent to the gas tank, the rollover valve assembly having at least two substantially spaced and opposed apertures formed on an external surface thereof, wherein an area defining an internal cavity is formed between the gas tank and the rollover valve assembly; and (3) an adhesive material disposed within the cavity sufficient to bond the gas tank to the rollover valve assembly, wherein the adhesive material is introduced into the cavity through either of the apertures, wherein the adhesive material substantially completely fills the cavity.

In accordance with a fourth embodiment of the present invention, a method is provided for forming a bonded component system, comprising: (1) providing a first component; (2) providing a second component adjacent to the first component, the second component having at least two spaced apertures formed on an external surface thereof, wherein an area defining an internal cavity is formed between the first component and the second component; and (3) disposing an adhesive material within the cavity sufficient to bond the first component to the second component, wherein the adhesive material is introduced into the cavity through either of the apertures.

In accordance with a fifth embodiment of the present invention, a method is provided for forming a bonded component system, comprising: (1) providing a first component; (2) providing a second component adjacent to the first component, the second component having at least two substantially spaced and opposed apertures formed on an external surface thereof, wherein an area defining an internal cavity is formed between the first component and the second component; and (3) disposing an adhesive material within the cavity sufficient to bond the first component to the second component, wherein the adhesive material is introduced into the cavity through either of the apertures, wherein the adhesive material substantially completely fills the cavity.

In accordance with a sixth embodiment of the present invention, a method is provided for forming a gas tank system, comprising: (1) providing a gas tank; (2) providing a rollover valve assembly adjacent to the gas tank, the rollover valve assembly having at least two substantially spaced and opposed apertures formed on an external surface thereof, wherein an area defining an internal cavity is formed between the gas tank and the rollover valve assembly; and (3) disposing an adhesive material within the cavity sufficient to bond the gas tank to the rollover valve assembly, wherein the adhesive material is introduced into the cavity through either of the apertures, wherein the adhesive material substantially completely fills the cavity.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Furthermore, it should be appreciated that the present invention can be practiced with any number of different components, such as but not limited to fuel tanks, rollover valves, fuel spuds, fuel pumps, and the like.

Figure 1:
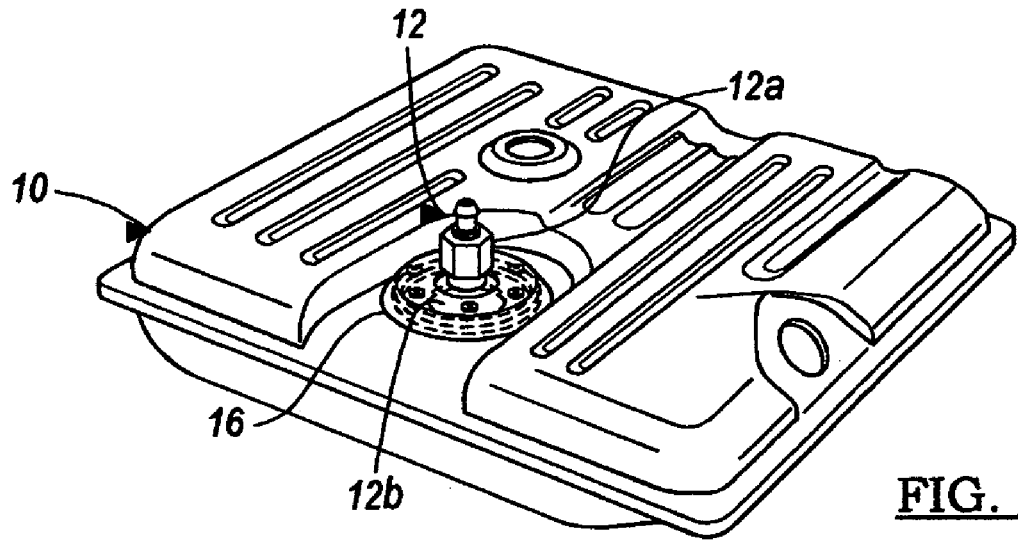
FIG. 1 is a perspective view of a fuel tank/rollover valve assembly, in accordance with the general teachings of the present invention.

Referring to FIG. 1, there is shown a fuel tank 10 and a rollover valve assembly 12. The rollover valve assembly preferably includes the rollover valve 12a itself, as well as a bracket member 12b that is fastened or otherwise attached to the rollover valve 12a. In accordance with one embodiment of the present invention, it is preferred to bond, preferably permanently, the rollover valve assembly 12, and more specifically the bracket member 12b, to at least a portion of a surface of the fuel tank 10.

Figure 2:
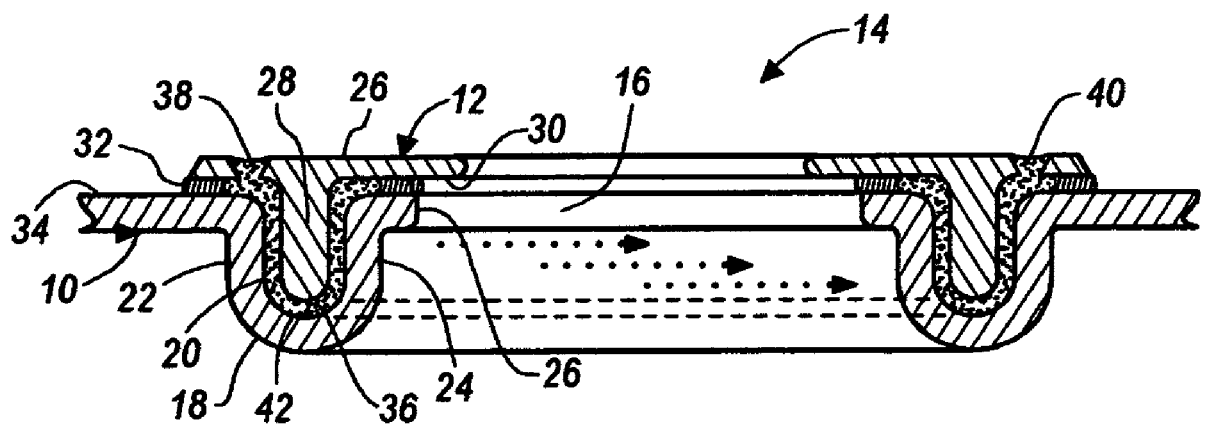
FIG. 2 is a partial sectional view of a fuel tank/rollover valve assembly, in accordance with one embodiment of the present invention.

Referring to FIG. 2, there is shown a non-limiting example of a mating relationship between the fuel tank 10 and the rollover valve assembly 12, specifically the bracket member 12b (the rollover valve 12a is not shown for purposes of clarity), so as to form an assembly 14.

The fuel tank 10 preferably includes an area defining an aperture 16 formed therein. Around the aperture 16, there is preferably formed a recessed U-shaped member 18 that preferably extends along the entire circumference of the aperture 16. The U-shaped member 18 preferably defines an annular channel 20 between an external wall 22 and internal wall 24. The internal wall 24 preferably includes a flange member 26 extending perpendicular to the internal wall 24.

The bracket member 12b preferably includes a substantially planar portion 26 and an annular protuberance 28 extending along the entire circumference of the underside 30 of the bracket member 12b. The protuberance 28 is intended to mate, preferably in an offset or spaced apart manner, with the channel 20. Thus, the protuberance 28 is preferably smaller in volume than the volume of the channel 20.

In order to maintain this offset arrangement, a spacer element 32, such as but not limited to a gasket, washer, or the like, may be disposed between the bracket member 12b and the upper surface 34 of the fuel tank 10. In this manner, a substantially hollow internal cavity 36 is defined by virtue of the fact that the bracket member 12b and the fuel tank 10 do not abut one another in a substantially flush manner.

In order to allow-for the introduction of material into the cavity 36, it is generally necessary to provide for at least one, more preferably at least two, and still more preferably more than two areas defining aperture 38, 40, respectively, in the bracket member 12b. In accordance with a preferred embodiment of the present invention, the apertures 38, 40, respectively, are preferably substantially spaced from one another and still more preferably are substantially opposed from one another. The apertures 38, 40, respectively, can be formed at the time of the manufacture of the bracket member 12b (e.g., injection molding, compression molding, and the like) or can be formed after the manufacture of the bracket member 12b (e.g., with the use of a stamp press, aperture press, awl press, or the like, and whether by hand or by aid of machine).

By providing the apertures 38, 40, respectively, an adhesive material 42 is operable to be disposed or otherwise placed into the cavity 36 (via either aperture 38 or 40) such that the cavity 36 is at least substantially completely filled with the adhesive material 42. The arrows indicate the flow of adhesive material 42 through the cavity 36 if the adhesive material 42 had been initially introduced through aperture 38. Conversely, if the adhesive material 42 had been initially introduced through aperture 40, the direction of the arrows would be reversed indicating that the adhesive material 42 would flow towards aperture 38.

Once a sufficient amount of the adhesive material 42 is placed into the cavity 36, it is preferably allowed to harden or cure so as to form a bond between the bracket member 12b and the fuel tank 10. Additionally, the hardened or cured adhesive material 42 provides structural support to the assembly 14. The detailed description of how the adhesive material 42 is introduced into, and how it substantially completely fills the cavity 36, will be described herein.

Any suitable adhesive material may be used in the present invention, provided that it is able to bond to the components to be bonded together. By way of a non-limiting example, with respect to the specific application of rollover valves and fuel tanks, adhesives that are capable of bonding to plastics, such as but not limited to HDPE, are preferred. In accordance with one embodiment of the present invention, acrylic-based adhesives are preferred, including but not limited to two-part acrylic adhesives. Additionally, the adhesive material may be introduced into the cavity by hand or may be injected by using mechanical aids, such as but not limited to pumps and the like.

In accordance with a preferred embodiment of the present invention, the adhesive material is preferably a structural adhesive. More preferably, the adhesive material is a low energy surface adhesive (LESA) type material. Examples of LESA materials can be found with reference to commonly-assigned U.S. Patent Application Publication No. US 2003/0044553 to Ramanathan et al. and US 2003/0047268 to Korchnak et al., and U.S. Pat. Nos. 6,706,831 and 6,710,145 to Sonnenschein, the entire specifications of which are expressly incorporated herein by reference.

Figure 3:
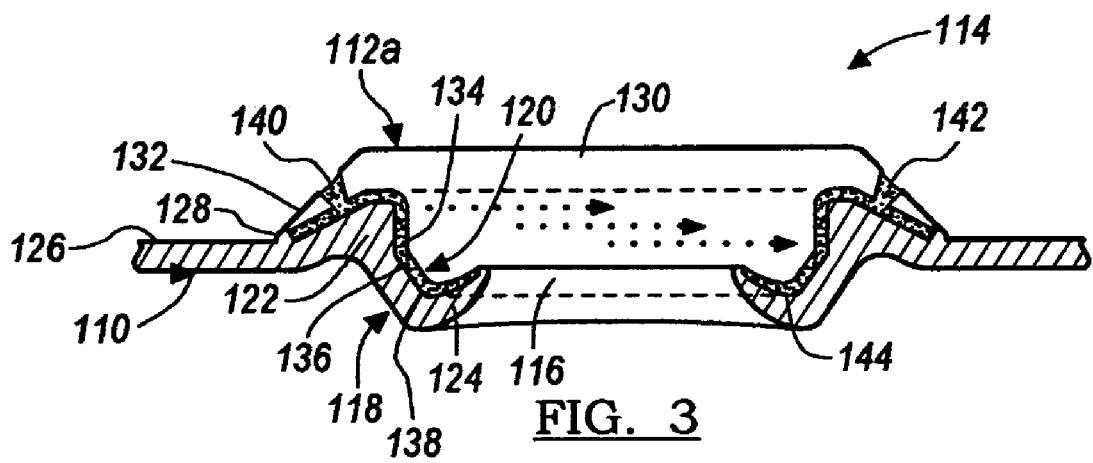
FIG. 3 is a partial sectional view of a fuel tank/rollover valve assembly, in accordance with an alternative embodiment of the present invention.

Referring to FIG. 3, there is shown an alternative assembly 114 between an alternative fuel tank 110 and an alternative rollover valve assembly 112, specifically the bracket member 112a (the rollover valve is not shown for purposes of clarity), in accordance with an alternative embodiment of the present invention.

The fuel tank 110 preferably includes an area defining an aperture 116 formed therein. Around the aperture 116, there is preferably formed a recessed and angled C-shaped member 118 that preferably extends along the entire circumference of the aperture 116. The C-shaped member 118 preferably defines an annular channel 120 between a shoulder member 122 and a flange member 124. On a top surface 126 of the fuel tank 110, an annular rim member 128 is formed, the purpose of which will be described herein.

The bracket member 112a preferably includes a substantially planar portion 130 and an annular edge member 132 extending along the entire circumference of the bracket member 112a. In accordance with a preferred embodiment of the present invention, the edge member 132 is preferably angled so as to abut or otherwise engage the rim member 128. Additionally, a portion of a wedge-shaped member 134 of the bracket member 112a preferably abuts or otherwise engages a surface 136 of the flange member 124. In this manner, the bracket member 112a is preferably offset or spaced apart from the fuel tank 110 so as to define a substantially hollow internal cavity 138 by virtue of the fact that the bracket member 112a and the fuel tank 110 do not abut one another in a substantially flush manner. Additionally, this configuration eliminates the need for a spacer element, as previously described in the first embodiment.

As with the previously described embodiment, in order to allow for the introduction of material into the cavity 138, it is generally necessary to provide for at least one, more preferably at least two, and still more preferably more than two areas defining aperture 140, 142, respectively, in the bracket member 112a. In accordance with a preferred embodiment of the present invention, the apertures 140, 142, respectively, are preferably substantially spaced from one another and still more preferably are substantially opposed from one another. The apertures 140, 142, respectively, can be formed at the time of the manufacture of the bracket member 112a (e.g., injection molding, compression molding, and the like) or can be formed after the manufacture of the bracket member 112a (e.g., with the use of a stamp press, aperture press, awl press, or the like, and whether by hand or by aid of machine).

By providing the apertures 140, 142, respectively, an adhesive material 144 is operable to be disposed or otherwise placed into the cavity 138 (via either aperture 140 or 142) such that the cavity 138 is at least substantially completely filled with the adhesive material 144. The arrows indicate the flow of adhesive material 144 through the cavity 138 if the adhesive material 144 had been initially introduced through aperture 140. Conversely, if the adhesive material 144 had been initially introduced through aperture 142, the direction of the arrows would be reversed indicating that the adhesive material 144 would flow towards aperture 140. Once a sufficient amount of the adhesive material 144 is placed into the cavity 138, it is preferably allowed to harden or cure so as to form a bond between the bracket member 112a and the fuel tank 110. Additionally, the hardened or cured adhesive material 144 provides structural support to the assembly 114.

Figure 4A:
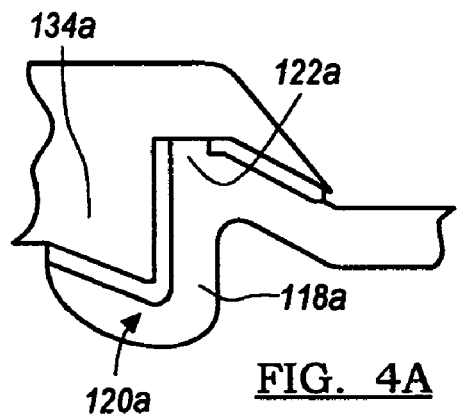
FIG. 4A is a partial sectional view of a detail of a fuel tank/rollover valve assembly, in accordance with a second alternative embodiment of the present invention.
Figure 4B:
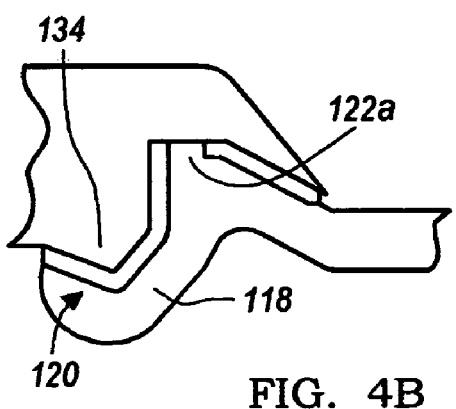
FIG. 4B is a partial sectional view of a detail of a fuel tank/rollover valve assembly, in accordance with a third alternative embodiment of the present invention.

It should be appreciated that the configurations of the C-shaped member 118, channel 120, shoulder member 122, flange member 124, and wedge-shaped member 134 can be varied depending, in part, on the particular packaging and/or application requirements. Referring to FIGS. 4A and 4B, an alternative shoulder member 122a is shown wherein the roundness of the shoulder member 122a has been replaced with more squared-off surfaces and angles. Additionally, an alternative wedge-shaped member 134a is shown wherein the softly angled surfaces thereof have been replaced with a sharply angled triangle-like surface that is deeply recessed within a corresponding surface of an alternative C-shaped member 118a defining a similar deeply recessed alternative channel 120a.

Without being bound to a particular theory of the operation of the present invention, it is believed that the joint designs shown in FIGS. 4A and 4B, it is believed that a reduction in the level of peel forces on both sides of the joint will be realized, when there is a force applied from below. By way of a non-limiting example, the use of surfaces that are angled with respect to one another, rather than surfaces that are substantially horizontal (e.g., flush) with respect to one another, will be better able to resist peel forces applied thereto. The exact degree of the angle is not thought to be critical to the present however, provided that the chosen degree enables the joint to at least partially resist peel forces applied thereto. By way of a non-limiting example, the angle of each surface is preferably in the range of about 1 degree to about 89 degrees, still more preferably in the range of about 30 degrees to about 60 degrees, and most preferably about 45 degrees.

Although the previous description related primarily to rollover valves and fuel tanks, it should be appreciated that the present invention is equally applicable to other types of components, assemblies, and systems, regardless of their configurations.

Figure 5:
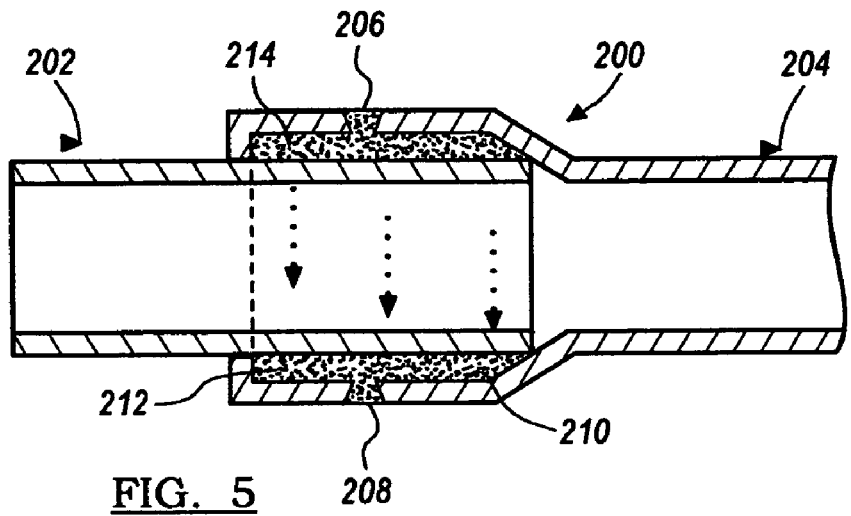
FIG. 5 is a partial sectional view of a partially nested two-component assembly, in accordance with a fourth alternative embodiment of the present invention.

Referring to FIG. 5, there is shown an assembly 200 including a first member 202 nested, at least partially, within a second member 204, in accordance with another alternative embodiment. These members, 202, 204, respectively, can be cross-sectionally configured in any number of shapes, including but not limiting to cylinders, squares, rectangles, and the like. By way of a non-limiting example, the members 202, 204, respectively can be comprised of pipes, conduits, tubes, hoses, and the like.

In this embodiment, two apertures, 206, 208, respectively, are provided on the second member 204. Because the first member 202 is offset from the internal surface 210 of the second member 204, a substantially hollow cavity 212 is formed. As with the previous embodiments, an adhesive material 214 is preferably introduced into the cavity 212 through one of the apertures 206 or 208. In this manner, the first and second members, 202, 204, respectively, are bonded together, wherein the cured and/or hardened adhesive material 214 provides structural support to the assembly 200. The arrows indicate the flow of adhesive material 214 through the cavity 212 if the adhesive material 214 had been initially introduced through aperture 206. Conversely, if the adhesive material 214 had been initially introduced through aperture 208, the direction of the arrows would be reversed indicating that the adhesive material 214 would flow towards aperture 206.

Figure 6:
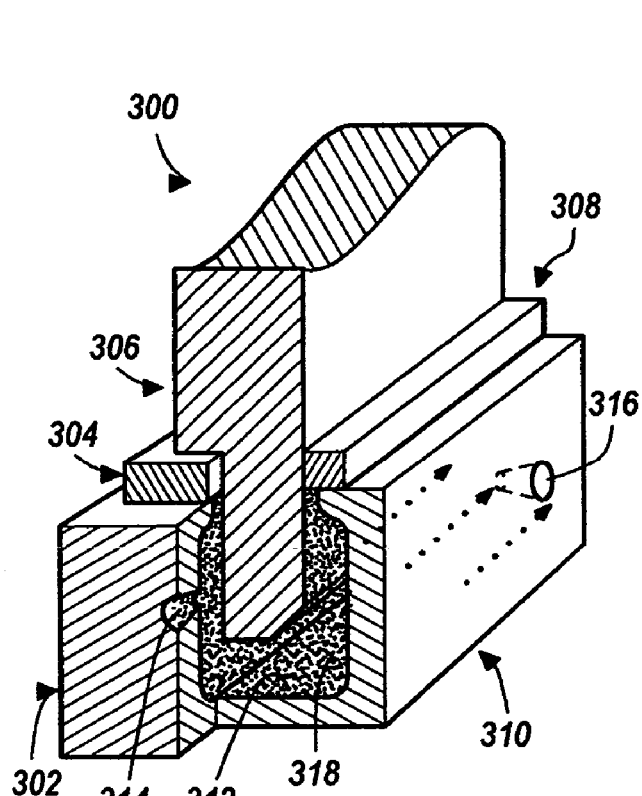
FIG. 6 is a partial sectional view of a five-component assembly, in accordance with a fifth alternative embodiment of the present invention.

Referring to FIG. 6, there is shown a relatively complex assembly 300 including five members 302, 304, 306, 308, and 310, respectively, in accordance with yet another alternative embodiment. Although these members 302, 304, 306, 308, and 310, respectively, are shown as being substantially rectangular, they can be cross-sectionally configured in any number of shapes, including but not limiting to cylinders, squares, and the like.

In this embodiment, the members 302, 304, 306, 308, and 310, respectively, have been brought into contact so as to abut or otherwise engage at least one other member. Because the members 302, 304, 306, 308, and 310, respectively, are offset from one another to one degree or another, a substantially hollow cavity 312 is formed. In this embodiment, two apertures, 314, 316, respectively, are provided on one of the members, in this case member 302, and another member, in this case 310. It should be appreciated that the placement of the apertures, 314, 316, respectively, are chosen, in part, on the basis of how best to ensure that an adhesive material can flow so as to at least substantially completely fill the cavity 312, and as such, contact the relevant surfaces of members 302, 304, 306, 308, and 310, respectively. As such, the apertures, 314, 316, respectively, are preferably substantially spaced and opposed from one another, to the extent possible.

As with the previous embodiments, the adhesive material 318 is preferably introduced into the cavity 312 through one of the apertures 314 or 316. In this manner, all of the members 302, 304, 306, 308, and 310, respectively, are bonded together, wherein the cured and/or hardened adhesive material 318 provides structural support to the assembly 300. The arrows indicate the flow of adhesive material 318 through the cavity 312 if the adhesive material 318 had been initially introduced through aperture 314. Conversely, if the adhesive material 318 had been initially introduced through aperture 316, the direction of the arrows would be reversed indicating that the adhesive material 318 would flow towards aperture 314.

The present invention can also be practiced with any types of components that nestingly engage one another, such as but not limited to windows/window sills, Intake manifolds, radiators, vacuum canisters, and the like.

Referring to FIGS. 7A–7D, a non-limiting example of a method of introducing the adhesive material into the cavity of the assembly is shown, in accordance with the general teachings of the present invention. Although the assembly 400 depicts a rollover valve bracket 402 being bonded to a fuel tank 404, it should be appreciated that the methodology can be applicable to other components, assemblies, and systems, including those previously described.

Figure 7A:
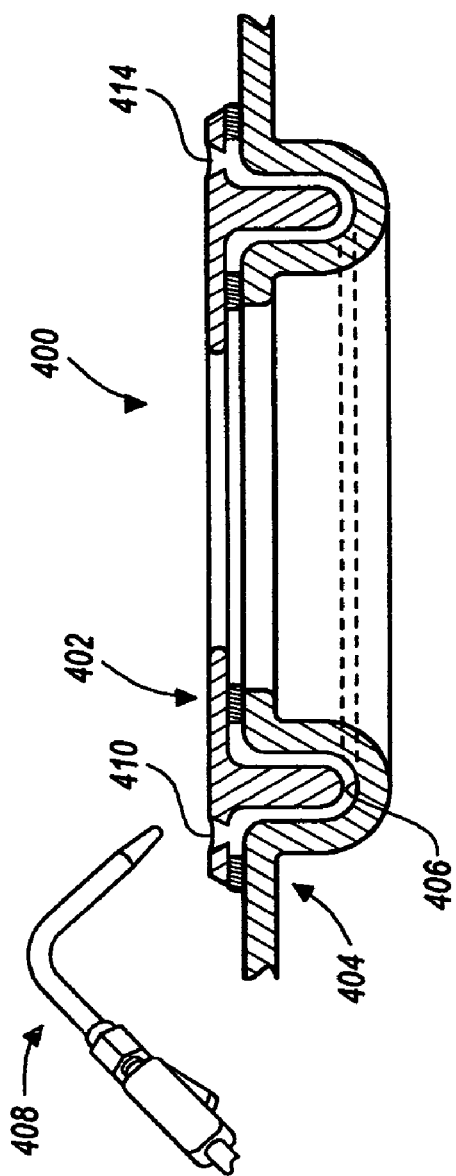
FIGS. 7A–7D is a partial schematic view of a methodology illustrating the introduction of an adhesive material into a cavity of a fuel tank/rollover valve assembly, in accordance with a sixth alternative embodiment of the present invention.

Referring to FIG. 7A, the cavity 406 is shown as being completely empty, except of course, for any air contained therein. A nozzle 408, connected to a source of adhesive material (not shown), is brought into proximity to one of the apertures 410 provided in the rollover valve bracket 402. It should be appreciated that other methods of introducing the adhesive material are contemplated by the present invention, including manually introducing the adhesive materials.

Figure 7B:
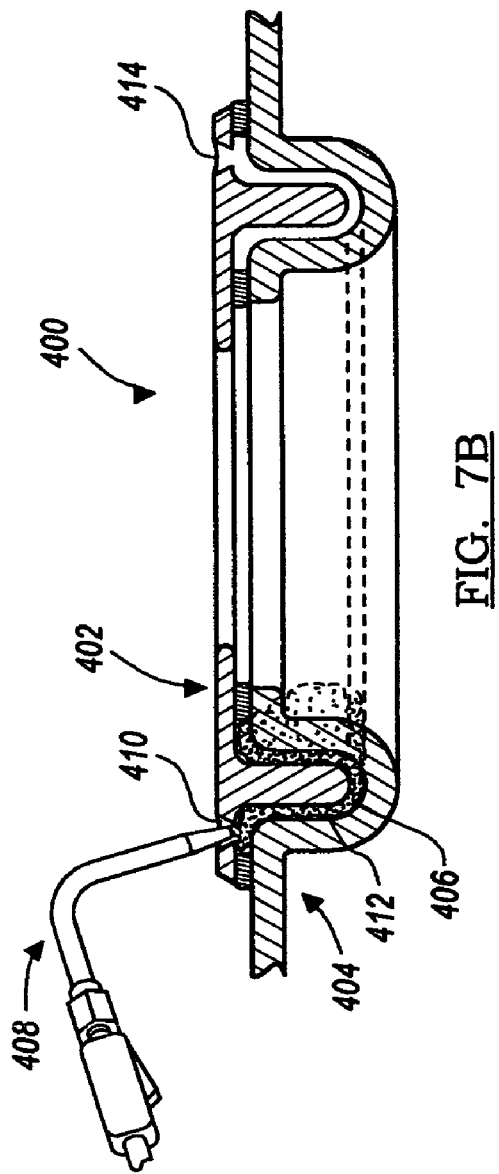

Referring to FIG. 7B, the nozzle 408 is at least partially inserted into the aperture 410 and adhesive material 412 is introduced therethrough into the cavity 406 with the adhesive material flowing or otherwise being forced to flow into the cavity 406 proximate the aperture 410. It should be appreciated that all other paths for exiting must be substantially sealed off to the flowing adhesive material 412, otherwise the flowing adhesive material 412 will travel along unintended paths and may not adequately fill the cavity 406.

Figure 7C:
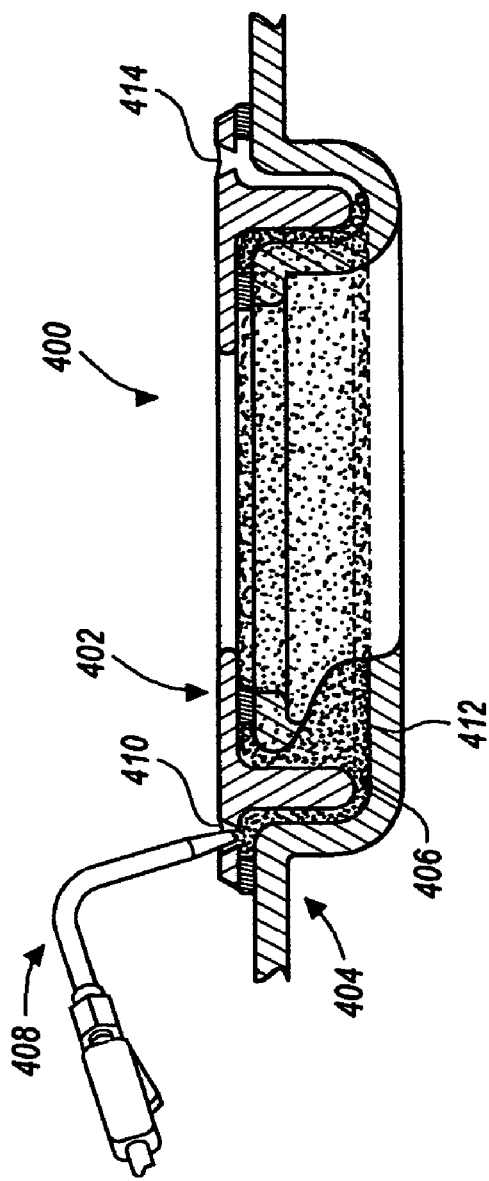
Figure 7D:
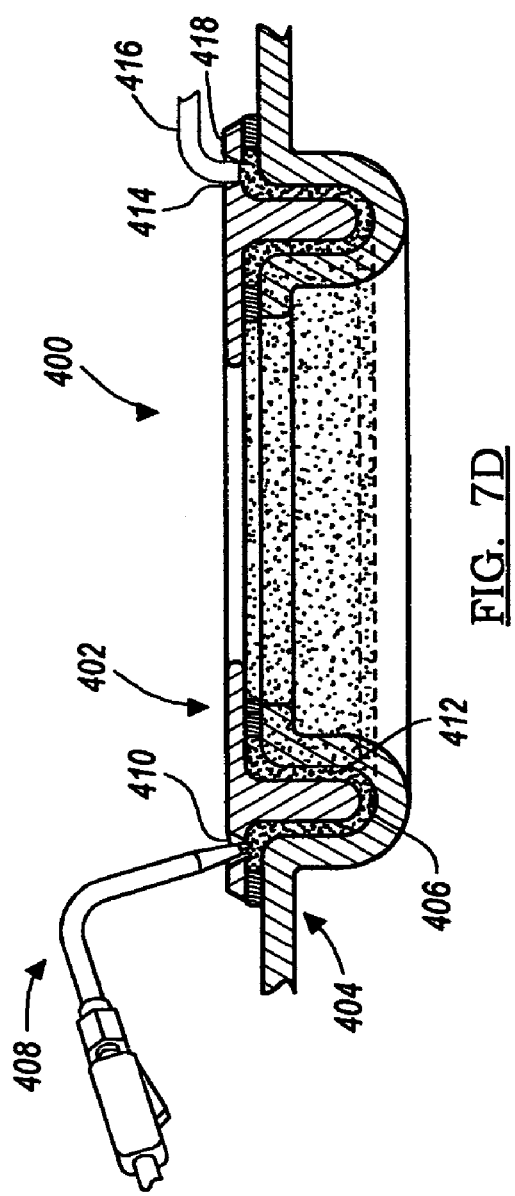

Referring to FIG. 7C, the nozzle 408 continues to dispense additional amounts of adhesive material 412 through the aperture 410 with the adhesive material flowing or otherwise being forced to flow further through the cavity 406 towards the other substantially spaced and opposed aperture 414.

Referring to FIG. 74, the nozzle 408 continues to dispense additional amounts of adhesive material 412 through the aperture 410 with the adhesive material flowing or otherwise being forced to flow further through the cavity 406 proximate to the other substantially spaced and opposed aperture 414. If the adhesive material is relatively viscous, an optional source of suction or vacuum 416 may be applied to the other aperture 414, so as to draw the adhesive material 412 towards the other aperture 414. It should be appreciated that adhesive materials of any viscosity may be used in the practice of the present invention, provided that they can be disposed within the 406 so as to substantially completely fill the same. Although the flow of adhesive material 412 through the cavity 406 is seen as commencing at aperture 410, it should be appreciated that the flow of adhesive material 412 could alternatively have commenced at aperture 414.

Once the adhesive material 412 flows out, or nearly out of the other aperture 414, the flow of adhesive material 412 is preferably ceased. If any adhesive material 412 does flow out of the other aperture 414 and spill not the surface 418 of the rollover valve bracket 402, it can be easily wiped up, e.g., with a damp cloth or the like.

It should be appreciated that this process can be automated and performed by computer-programmed robots, e.g., on an assembly line. By way of a non-limiting example, the assembly 400 can be placed on an assembly line, apertures could be punched in the surface of the rollover valve bracket 402, and a precise, pre-measured amount of adhesive material 412 can be injected into the aperture 410, such that it substantially completely fills the cavity 406 such that the adhesive material 412 does not spill out from the other aperture 414.

In order to determine the flow characteristics of the adhesive material, the following test was performed, as described in Example I, below:

EXAMPLE I

The flow of the adhesive was tested by mocking up a joint design using transparent plastic cups. The cups were placed one in the other with the outer cup having two apertures drilled at opposite ends. A two-part acrylic adhesive was injected in one aperture until it started coming out of the aperture on the other side. The adhesive had a Brookfield viscosity of 20,000 cps, as measured at 20 rpm with spindle number 7. A two-part pneumatic gun was used to dispense the adhesive at a pressure of 30 psi. There were two joints mocked up, one with a thickness of 0.7 mm and one with a thickness of 2 mm. The adhesive completely filled the cavity both times without any detectable air gaps.

In order to determine the strength of the resulting bonds between the components, the following test was performed, as described in Example II, below:

EXAMPLE II

Three sample HDPE joints were mocked up with 7 mm thick HDPE, similar to the joints shown in FIG. 3. A two-part acrylic adhesive with a Brookfield viscosity of 50,000 cps was injected in one aperture, using a 2-part pneumatic gun at 40 psi, until it came out of the other aperture. The adhesive used was of the Low Energy Surface Adhesive (LESA) type and was obtained from Dow Chemical (Midland, Mich.) under the designations Lot Nos. 200302273-14-1 and 200302273-14-2. The adhesive was allowed to cure for 24 hours, and then, using an Instron machine, the upper part of the joint was pushed while the lower was constrained. In all three samples the HDPE failed in substrate failure mode. The force of failure for each sample was as follows: 2891 N, 3011 N, and 3176 N, respectively. After the joints failed, they were cut into four pieces to see how uniformly the respective cavities were filled. In all cases, there were no visible voids in the respective bond lines.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A bonded component system, comprising:
   a first component comprising a gas tank;
   a second component adjacent to the first component, the second component at least two spaced apertures;
   wherein an area defining an internal cavity is formed between the first component and the second component; and
   an adhesive material disposed within the cavity sufficient to bond the first component to the second component and provide structural support to the bonded component system, wherein a sufficient amount of the adhesive material is introduced into the cavity through either of the apertures such that the adhesive material reaches an area proximate to the other spaced aperture.

2. A bonded component system according to claim 1, wherein the second component is a rollover valve assembly.

3. A bonded component system according to claim 1, wherein the apertures are substantially opposed from one another.

4. A bonded component system according to claim 1, wherein the adhesive material is pumped into the cavity.

5. A bonded component according to claim 1, wherein the adhesive material substantially completely fills the cavity.

6. A bonded component according to claim 1, wherein the adhesive material is comprised of an acrylic-type adhesive material.

7. A bonded component system according to claim 1, wherein a suction source is applied to the other spaced aperture so as to draw at least a portion of the adhesive material towards an area proximate to the other spaced aperture.

8. A bonded component system, comprising:
   a first component comprising a gas tank;
   a second component adjacent to the first component, the second component defining at least two substantially spaced and opposed apertures;
   wherein an area defining an internal cavity is formed between the first component and the second component; and
   an adhesive material disposed within the cavity sufficient to bond the first component to the second component and provide structural support to the bonded component system, wherein a sufficient amount of the adhesive material is introduced into the cavity through either of the apertures such that the adhesive material reaches an area proximate to the other spaced aperture; and
   wherein the adhesive material substantially completely fills the cavity.

9. A bonded component system according to claim 8, wherein the second component is a rollover valve assembly.

10. A bonded component system according to claim 8, wherein the adhesive material is pumped into the cavity.

11. A bonded component system according to claim 8, wherein the adhesive material is comprised of an acrylic-type adhesive material.

12. A bonded component system according to claim 8, wherein a suction source is applied to the other spaced aperture so as to draw at least a portion of the adhesive material towards an area proximate to the other spaced aperture.

13. A gas tank system, comprising:
   a gas tank;
   a rollover valve assembly adjacent to the gas tank, the rollover valve assembly having at least two substantially spaced and opposed apertures formed on an external surface thereof;
   wherein an area defining an internal cavity is formed between the gas tank and the rollover assembly; and
   an adhesive material disposed within the cavity sufficient to bond the gas tank to the rollover valve assembly, wherein the adhesive material substantially completely fills the cavity.

14. A gas tank system according to claim 13, wherein the adhesive material is pumped into the cavity.

15. A gas tank system according to claim 13, wherein the adhesive material is comprised of an acrylic-type adhesive material.

16. A gas tank system according to claim 13, wherein a sufficient amount of the adhesive material is introduced into the cavity such that the adhesive material reaches an area proximate to the other spaced aperture.

17. A gas tank system according to claim 13, wherein a suction source is applied to the other spaced aperture so as to draw at least a portion of the adhesive material towards an area proximate to the other spaced aperture.

18. A gas tank system according to claim 13, wherein a portion of a surface of the gas tank includes a flange member.

19. A gas tank system according to claim 18, wherein the flange is angled.

20. A gas tank system according to claim 13, wherein a portion of an external surface of the gas tank includes a shoulder member.

21. A gas tank system according to claim 20, wherein the shoulder member is angled.

22. A gas tank system according to claim 13, wherein a portion of a surface of the rollover valve assembly includes a wedge-shaped member extending therefrom.

23. A gas tank system according to claim 13, wherein a portion of a surface of the rollover valve assembly includes a lip member extending therefrom.

24. A gas tank system according to claim 13, wherein the lip member is angled.

25. A method for forming a bonded component system, comprising:
providing a first component comprising a gas tank;
providing a second component adjacent to the first component, the second component defining at least two spaced apertures;
wherein an area defining an internal cavity is formed between the first component and the second component; and
disposing an adhesive material within the cavity sufficient to bond the first component to the second component and provide structural support to the bonded component system, wherein a sufficient amount of the adhesive material is introduced into the cavity through either of the apertures such that the adhesive material reaches an area proximate to the other spaced aperture.

26. The method according to claim 25, wherein the second component is a rollover valve assembly.

27. The method according to claim 25, wherein the apertures are substantially opposed from one another.

28. The method according to claim 25, wherein the adhesive material is pumped into the cavity.

29. The method according to claim 25, wherein the adhesive material substantially completely fills the cavity.

30. The method according to claim 25, wherein the adhesive material is comprised of an acrylic-type adhesive material.

31. The method according to claim 25, wherein a suction source is applied to the other spaced aperture so as to draw at least a portion of the adhesive material towards an area proximate to the other spaced aperture.

32. A method for forming a bonded component system, comprising:
providing a first component;
providing a second component adjacent to the first component, the second component defining at least two substantially spaced and opposed apertures;
wherein an area defining an internal cavity is formed between the first component and the second component; and
disposing an adhesive material within the cavity sufficient to bond the first component to the second component and provide structural support to the bonded component system, wherein a sufficient amount of the adhesive material is introduced into the cavity through either of the apertures such that the adhesive material reaches an area proximate to the other spaced aperture,
applying a suction source to the other spaced aperture so as to draw at least a portion of the adhesive material towards an area proximate to the other spaced aperture and;
wherein the adhesive material substantially completely fills the cavity.

33. The method according to claim 32, wherein the first component is a gas tank.

34. The method according to claim 32, wherein the second component is a rollover valve assembly.

35. The method according to claim 32, wherein the adhesive material is pumped into the cavity.

36. The method according to claim 32, wherein the adhesive material is comprised of an acrylic-type adhesive material.

37. A method for forming a gas tank system, comprising:
providing a gas tank;
providing a rollover valve assembly adjacent to the gas tank, the rollover valve assembly having at least two substantially spaced and opposed apertures formed on an external surface thereof;
wherein an area defining an internal cavity is formed between the gas tank and the rollover valve assembly; and
disposing an adhesive material within the cavity sufficient to bond the gas tank to the rollover valve assembly, wherein the adhesive material is introduced into the cavity through either of the apertures, wherein the adhesive material substantially completely fills the cavity.

38. The method according to claim 37, wherein the adhesive material is pumped into the cavity.

39. The method according to claim 37, wherein the adhesive material is comprised of an acrylic-type adhesive material.

40. The method according to claim 37, wherein a sufficient amount of the adhesive material is introduced into the cavity such that the adhesive material reaches an area proximate to the other spaced aperture.

41. The method according to claim 37, wherein a suction source is applied to the other spaced aperture so as to draw at least a portion of the adhesive material towards an area proximate to the other spaced aperture.

* * * * *